(12) United States Patent
Ashikawa et al.

(10) Patent No.: US 9,489,944 B2
(45) Date of Patent: Nov. 8, 2016

(54) INFORMATION PROCESSING DEVICE, METHOD AND COMPUTER PROGRAM PRODUCT FOR PROCESSING VOICE RECOGNITION DATA

(71) Applicant: KABUSHIKI KAISHA TOSHIBA, Minato-ku, Tokyo (JP)

(72) Inventors: Taira Ashikawa, Kanagawa (JP); Kouji Ueno, Shizuoka (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 154 days.

(21) Appl. No.: 14/563,174

(22) Filed: Dec. 8, 2014

(65) Prior Publication Data

US 2015/0170649 A1    Jun. 18, 2015

(30) Foreign Application Priority Data

Dec. 13, 2013  (JP) ................................. 2013-258077

(51) Int. Cl.
*G10L 15/26*   (2006.01)
*G10L 15/22*   (2006.01)
G10L 15/01    (2013.01)

(52) U.S. Cl.
CPC ................ *G10L 15/22* (2013.01); *G10L 15/01* (2013.01); *G10L 2015/228* (2013.01)

(58) Field of Classification Search
CPC ............................................. G10L 2015/228
See application file for complete search history.

(56) References Cited

U.S. PATENT DOCUMENTS

| 5,970,460 | A  | * | 10/1999 | Bunce ..................... G10L 15/22 704/270 |
| 7,363,224 | B2 |   | 4/2008  | Huang et al. |
| 8,498,864 | B1 |   | 7/2013  | Liang et al. |
| 8,571,862 | B2 |   | 10/2013 | Rao et al. |
| 2002/0099542 | A1 | * | 7/2002 | Mitchell ............. G06F 17/2241 704/231 |
| 2004/0024601 | A1 | * | 2/2004 | Gopinath ................ G10L 15/22 704/270 |
| 2005/0131686 | A1 | * | 6/2005 | Yamamoto ............ G10L 15/197 704/231 |

FOREIGN PATENT DOCUMENTS

| JP | 2002-297502 | 10/2002 |
| JP | 2005-182208 | 7/2005 |
| JP | 2005-196140 | 7/2005 |

(Continued)

*Primary Examiner* — Qian Yang
(74) *Attorney, Agent, or Firm* — Amin, Turocy & Watson LLP

(57) ABSTRACT

According to an embodiment, a memory controller stores, in a memory, character strings in voice text obtained through voice recognition on voice data, a node index, a recognition score, and a voice index. A detector detects reproduction section of the voice data. An obtainer obtains reading of a phrase in a text written down from the reproduced voice data, and obtains insertion position of character strings. A searcher searches for a character string including the reading. A determiner determines whether to perform display based on the recognition score corresponding to the retrieved character string. A history updater stores, in a memory, candidate history data indicating the retrieved character string, the recognition score, and the character insertion position. A threshold updater decides on a display threshold value using the recognition score of the candidate history data and/or the recognition score of the character string selected by a selector.

8 Claims, 13 Drawing Sheets

(56) References Cited

U.S. PATENT DOCUMENTS

| | | |
|---|---|---|
| 2007/0100619 A1 | 5/2007 | Purho |
| 2008/0162137 A1* | 7/2008 | Saitoh .................... G10L 15/22 704/251 |
| 2013/0080163 A1 | 3/2013 | Shimogori et al. |
| 2015/0228279 A1* | 8/2015 | Biadsy .................... G10L 15/26 704/235 |

FOREIGN PATENT DOCUMENTS

| | | |
|---|---|---|
| JP | 2010-211075 | 9/2010 |
| JP | 2010-257403 | 11/2010 |
| JP | 2011-243011 | 12/2011 |
| JP | 4876198 | 2/2012 |
| JP | 2013-069228 | 4/2013 |
| WO | 2012063360 | 5/2012 |

* cited by examiner

FIG.2

| ID | START NODE | END NODE | START POINT | END POINT | CANDIDATE CHARACTER STRING | READING | SCORE |
|---|---|---|---|---|---|---|---|
| 1 | S | 1 | 0 | 0.25 | IDO (IN KANJI) | IDO (IN KANA) | 75 |
| 2 | S | 3 | 0 | 0.5 | MAIDO (IN KANJI) | MAIDO (IN KANA) | 100 |
| 3 | 1 | 3 | 0.25 | 0.5 | WA (IN KANA) | WA (IN KANA) | 50 |
| 4 | 1 | 2 | 0.25 | 0.75 | NI (IN KANA) | NI (IN KANA) | 75 |
| 5 | 3 | 2 | 0.5 | 0.75 | ARI (IN KANJI) | ARI (IN KANA) | 25 |
| 6 | 2 | 4 | 0.75 | 1.0 | GA (IN KANA) | GA (IN KANA) | 50 |
| 7 | 3 | 5 | 0.5 | 1.0 | ARIGATOU (IN KANA) | ARIGATOU (IN KANA) | 100 |
| 8 | 4 | 6 | 1.0 | 1.25 | IMASU (IN KANA) | IMASU (IN KANA) | 50 |
| 9 | 5 | 6 | 1.0 | 1.25 | GOZAIMASU. (IN KANA) | GOZAIMASU (IN KANA) | 100 |
| 10 | 6 | 7 | 1.25 | 1.5 | KA (IN KANA) | KA (IN KANA) | 50 |
| 11 | 6 | E | 1.25 | 1.5 | (NONE) | (NONE) | 100 |
| 12 | 7 | E | 1.5 | 1.5 | (NONE) | (NONE) | 50 |

| ID | CHARACTER INSERTION POSITION | CANDIDATE CHARACTER STRING | SCORE | VOICE INDEX ID |
|---|---|---|---|---|
| 1 | 0 | MAIDO (IN KANJI) | 100 | 2 |
| 2 | 2 | ARIGATOU (IN KANA) | 100 | 7 |
| 3 | 2 | ARI (IN KANJI) | 25 | 5 |
| 4 | 7 | GOZAIMASU. (IN KANA) | 100 | 9 |
| 5 | 12 | ABC | 75 | 13 |
| 6 | 15 | KAISHA (IN KANJI) | 75 | 14 |
| 7 | 17 | DE GOZAIMASU. (IN KANA) | 75 | 15 |

FIG.11

(1) MULTIPLE-
CANDIDATE-
PRESENTATION
INSTRUCTION

MAIDO ARIGATOU GOZAIMASU.
(IN KANJI AND KANA). DEF KAISHA NO
(IN KANJI AND KANA)

NO TAROU DESU.
(IN KANJI AND KANA)

⇩

MAIDO ARIGATOU GOZAIMASU.
(IN KANJI AND KANA). DEF KAISHA NO
(IN KANJI AND KANA)

| NO TAROU DESU. (IN KANJI AND KANA) |
| NO JIROU DESU. (IN KANJI AND KANA) |
| NO SABUROU DESU. (IN KANJI AND KANA) |

FIG.14

| ID | CANDIDATE CHARACTER STRING | START NODE | END NODE | SCORE |
|---|---|---|---|---|
| 1 | MAIDO ARIGATOU GOZAIMASU. (IN KANJI AND KANA) | S | 6 | 400 |
| 2 | MAIDO ARI GA (IN KANJI AND KANA) | S | 4 | 325 |
| 3 | IDO WA ARIGATOU (IN KANJI AND KANA) | S | 5 | 425 |
| 4 | IDO WA ARI (IN KANJI AND KANA) | S | 4 | 350 |
| 5 | IDO NI GA (IN KANJI AND KANA) | 1 | 6 | 350 |
| 6 | WA ARIGATOU GOZAIMASU. (IN KANA) | 1 | 6 | 425 |
| 7 | WA ARI GA (IN KANJI AND KANA) | 1 | 4 | 350 |
| 8 | NI GA IMASU (IN KANA) | 1 | 6 | 350 |
| 9 | ARI GA IMAGU (IN KANJI AND KANA) | 3 | 4 | 350 |
| 10 | GA IMASU KA (IN KANA) | 2 | 7 | 350 |
| 11 | GA IMASU (IN KANA) | 2 | E | 350 |
| 12 | ARIGATOU GOZAIMASU. (IN KANA) | 3 | E | 400 |

INFORMATION PROCESSING DEVICE, METHOD AND COMPUTER PROGRAM PRODUCT FOR PROCESSING VOICE RECOGNITION DATA

CROSS-REFERENCE TO RELATED APPLICATIONS

This application is based upon and claims the benefit of priority from Japanese Patent Application No. 2013-258077 filed on Dec. 13, 2013; the entire contents of which are incorporated herein by reference.

FIELD

Embodiments described herein relate generally to an information processing device and method, and a computer program product.

BACKGROUND

Typically, various technologies are known that enable streamlining of the task of converting voice data into a text (hereinafter, called a transcription task). For example, a technology is known in which, while a user is inputting characters during a transcription task, phrases which would be eventually input from the target voice data for transcription are estimated and presented to the user.

Moreover, a character input technology such as an input estimation technology or an estimation conversion technology is known in which, aside from displaying kana-kanji conversion candidates of a reading character string that has been input, the character string that is estimated to follow the reading character string is displayed as a conversion candidate character string (hereinafter, called estimation candidate).

However, every time the input candidate is to be presented, it is necessary to have the reading information ready. Hence, even in the case in which the user selects (accepts) the input candidate presented to him or her; it is still necessary to have the reading information ready for the purpose of presenting the next input candidate. Thus, after selecting the input candidate, the user again needs to perform character input, thereby leading to a decline in the work efficiency. Besides, regarding the voice data having low voice recognition accuracy, there is a possibility that incorrect input candidates are presented in succession. As a result, the input candidates become a hindrance to the user, thereby leasing to a decline in the work efficiency.

Moreover, in the conventional character input technology, input candidates are created only using a kana-kanji conversion dictionary in which reading character strings and post-kana-kanji-conversion characters are associated, and using character input history information. This leads to a decline in the work efficiency during a transcription task. Moreover, a candidate (hereinafter, called a follow-on candidate) that would follow a selected estimation candidate is searched in a conversion dictionary (an estimation conversion dictionary) dedicated to the character strings starting with user-selected estimation candidate. For this reason, in order to input long character strings (for example, in the units of sentences) in succession, it becomes necessary to hold long character strings in the estimation conversion dictionary, too. As a result, the size of the estimation conversion dictionary goes on increasing, thereby leading to a decline in the search efficiency of estimation candidates.

BRIEF DESCRIPTION OF THE DRAWINGS

FIG. 2 is a diagram illustrating an example of a lattice structure of a voice recognition result;

FIG. 11 is a diagram illustrating an example of user operations and multiple candidate display;

FIG. 14 is a diagram illustrating an example of a list of voice recognition results converted into a trie structure.

DETAILED DESCRIPTION

Figure 1:
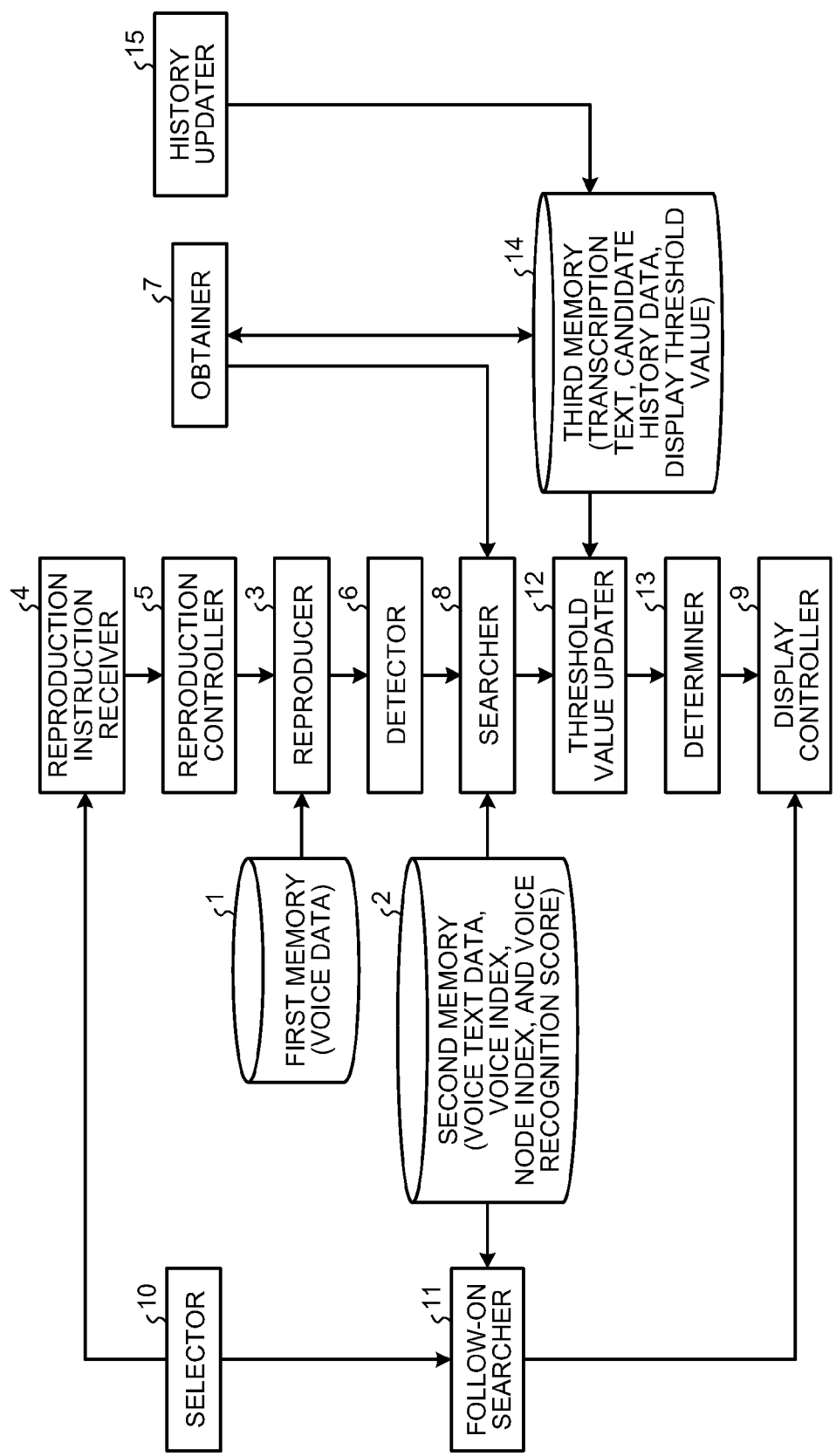
FIG. 1 is a functional block diagram of an information processing device according to a first embodiment.

According to an embodiment an information processing device includes a memory controller, a detector, an obtainer, a searcher, a determiner, a display controller, a history updater, a selector, and a threshold value updater. The memory controller stores, in a memory: a plurality of character strings included in a voice text obtained by performing a voice recognition on voice data; a node index indicating start position information and end position information of each of the character strings in the voice text; a voice recognition score obtained by performing the voice recognition; and a voice index of voice position information indicating a position of each of the character strings in the voice data.

The detector detects reproduction section information which indicates a reproduced section of the voice data. The obtainer obtains reading information, which represents at least a part of a character string representing reading of a phrase in a text written down from the voice data that has been reproduced, and obtain insertion position information, which indicates a character insertion position in the written text. The searcher specifies, as a target character string for searching, a character string that, from among the plurality of character strings stored in the memory, has the corresponding voice position information included in the reproduction section information, and searches the specified character string for a character string that includes reading indicated by the reading information. When a value of the voice recognition score corresponding to the character string obtained by the searcher is equal to or greater than a display threshold value, the determiner determines to display the character string obtained by the searcher. The display controller displays the character string, which is determined by the determiner, on a display unit. The history updater performs storage control to store, in a candidate history memory, candidate history data in which the character string obtained by the searcher, the voice recognition score, and the character insertion position are associated, and updates the candidate history data according to a change in a text. When the character string displayed by the display controller is subjected to a selection operation, the selector selects the character string. The threshold value updater decides on the display threshold value, which is used in comparison with a voice recognition score by the determiner, using at least one of a voice recognition score of the candidate history data and a voice recognition score of the character string selected by the selector.

Various embodiments are described below in detail with reference to the accompanying drawings. The embodiments described herein are only exemplary, and are not the only possible embodiments. The information processing device according to the embodiments can be implemented using, what is called, a personal computer device. Herein, the information processing device implemented using a personal computer device has a function of reproducing voice data as well as has a text creating function for creating a text according to the operations of an operator (hereinafter, called a user). During a transcription task, while reproducing voice data that has been recorded, the user operates a keyboard and performs text input with the aim of converting the voice data into a text.

General Outline

In an information processing device according to the embodiments, information indicating voice recognition scores and end node indexes obtained as the result of a voice recognition is attached as the information about input candidates. Then, the input candidates having the voice recognition scores equal to or greater than a particular threshold value (hereinafter, called a display threshold value) are presented to the user. If the user selects an input candidate presented to him or her, the information about the end node index of the selected input candidate is obtained; and the input candidate starting with the obtained end node index is retrieved and presented to the user as the input candidate.

Moreover, in the information processing device, the voice recognition score of the character string of an input candidate and the character insertion position are associated with each other, and the associated information is stored as candidate history data. Then, the display threshold value is decided using (1) the voice recognition score of the candidate history data and (2) the user selection of the input candidate. Hence, in a case in which the result of voice recognition is not satisfactory, it becomes possible to avoid presentation of unnecessary input candidates. Besides, simultaneous to the selection of the input candidate, the input candidates that would follow the selected candidate can be made selectable for the user. This enables achieving further streamlining of the transcription task.

First Embodiment

FIG. 1 is a functional block diagram of an information processing device according to a first embodiment. As illustrated in FIG. 1, the information processing device includes a first memory 1, a second memory 2, a reproducer 3, a reproduction instruction receiver 4, a reproduction controller 5, a detector 6, an obtainer 7, a searcher 8, a display controller 9, a selector 10, a follow-on searcher 11, a threshold value updater 12, a determiner 13, a third memory 14, and a history updater 15. Herein, the reproducer 3 to the determiner 13 and the history updater 15 can be all implemented either using software or using hardware. Alternatively, some of those constituent elements can be implemented using software, while the remaining constituent elements can be implemented using hardware.

The first memory 1 stores therein voice data. Regarding the voice data, it is possible to use voice files in the WAV format or the mp3 format. Meanwhile, the voice data can be obtained by implementing an arbitrary method. For example, the voice data can be obtained via a network such as the Internet, or can be obtained using a microphone device.

The second memory 2 stores therein a plurality of character strings included in a voice text, which is obtained by performing a voice recognition on voice data, and a voice index of voice position information that indicates a position of each of the character strings in the voice data. Moreover, the second memory 2 stores therein a degree of reliability (hereinafter, called a voice recognition score) that is calculated during the voice recognition. The searcher 8 represents an example of a memory controller that stores the voice index etc. in the second memory 2.

Regarding the voice recognition, it is possible to use various known techniques. As an example, in the voice recognition, the voice data is processed at regular intervals of 10 ms to 20 ms. Then, the association with the voice position information can be achieved by obtaining the target voice data for processing and the corresponding recognition result during the course of the voice recognition.

In FIG. 2 is illustrated an example of a voice recognition result (a start node index, a voice index, a voice recognition score, an end node index, a character string, and a reading) of voice data corresponding to a Japanese sentence "maido arigatou gozaimasu." in kanji and kana. In the first embodiment, the voice position information is expressed using time information which indicates the time required to reproduce the voice data from the start up to the concerned position (herein, the unit of time information is, for example, seconds).

For example, with respect to the voice position information corresponding to "arigatou" in kana illustrated in FIG. 2, the start point is "0.5 s (500 ms)" and the end point is "1.0 s (1000 ms)". It implies that, when the voice data is reproduced, the period of time starting from the point of time after the elapse of 0.5 seconds since the reproduction start time of the voice data and ending at the point of time after the elapse of 1.0 seconds since the reproduction start time represents the period of time during which a voice sounding "arigatou" is reproduced.

Figures 3, 4:
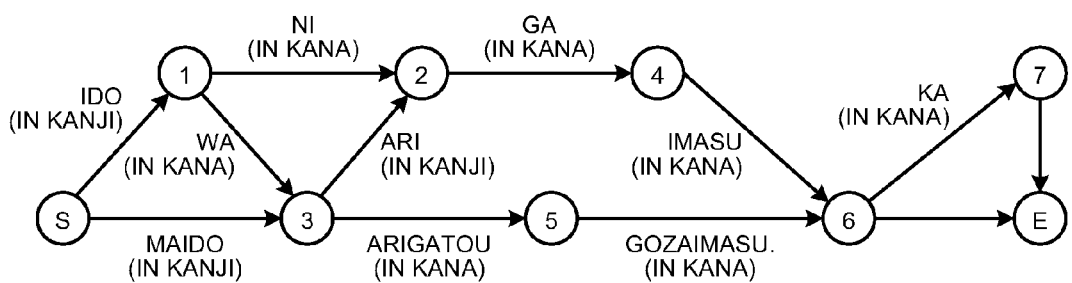
FIG. 3 is a diagram illustrating an exemplary lattice structure obtained by performing voice recognition with respect to voice data.
FIG. 4 is a diagram illustrating an example of candidate history data.

In FIG. 3 is illustrated an exemplary lattice structure obtained by performing the voice recognition with on the voice data. With reference to FIG. 3, the nodes meant for separating the morphemes are illustrated in circles, and the numbers written inside the circles represent identifiers for identifying the respective nodes. With reference to FIG. 3, the morphemes are illustrated as straight lines that join nodes. In the example illustrated in FIG. 3, at least some part of each route starting from a node S to a node E can be treated as a recognition candidate. For example, "maido arigatou gozaimasu." in kanji and kana obtained by joining the morphemes from the node S to the node E can be treated as a recognition candidate; or the phrase "maido arigatou" in kanji and kana starting from the node S to a node 5 can be treated as a recognition candidate; or the word "maido" in kanji starting from the node S to a node 3 can be treated as a recognition candidate.

As illustrated in FIG. 4, the third memory 14 stores therein the text written by a user (hereinafter, called transcription text) and stores therein data (hereinafter, called candidate history data) in which insertion position information, which indicates the insertion positions of the characters in the transcription text, character strings serving as input candidates, and voice recognition scores are associated with each other. The recording of the candidate history data can be done around the current character insertion position (the candidate history data corresponding to the character insertion positions that are close to the current character insertion position can be stored).

The reproducer 3 is a voice data reproduction device that is configured using, for example, a speaker device, a digital-to-analog (D/A) converter, and a headphone device. The reproduction controller 5 controls the reproducer 3 in such a way that, when the reproduction instruction receiver 4 receives a reproduction start instruction for starting reproduction, the reproducer 3 reproduces the voice data stored in the first memory 1. Moreover, the reproduction controller 5 controls the reproducer 3 in such a way that, when the reproduction instruction receiver 4 receives a reproduction end instruction for ending reproduction, the reproducer 3 stops reproducing the voice data. Herein, the reproduction controller 5 can be implemented using software such as an operating system (OS) of a personal computer device or an audio function of a driver. Alternatively, the reproduction controller 5 can be implemented using hardware circuitry such as electronic circuitry.

The reproduction instruction receiver 4 receives instructions for starting or ending voice reproduction. When a reproduction start instruction is obtained from the reproduction instruction receiver 4, the reproduction controller 5 controls the reproducer 3 to reproduce the voice data.

When a reproduction end instruction is obtained from the reproduction instruction receiver 4, the reproduction controller 5 controls the reproducer 3 to stop reproducing the voice data. Herein, the reproducer 3 reproduces, for example, the voice data stored in the first memory 1.

The detector 6 detects reproduction section information that, of the voice data, indicates the reproduced section which has been reproduced by the reproducer 3. More particularly, as the reproduction section information, the detector 6 detects time information indicating the section of the voice data starting from a reproduction start position, which indicates the position at which the reproducer 3 started the reproduction, to a reproduction end position, which indicates the position at which the reproducer 3 ended the reproduction.

The obtainer 7 obtains reading information, which indicates at least some part of a character string that represents the reading of a phrase in a text written down from the voice data reproduced by the reproducer 3. In addition, the obtainer 7 obtains insertion position information, which indicates the insertion positions of character strings in the written text. For example, consider a case in which, with the aim of writing the word "maido" in kanji at the start of the transcription text, the user operates a keyboard and inputs the character "ma" in kana of the character string "maido" in kana that represents the reading of the word "maido" in kanji. In that case, with "ma" serving as the reading information, the obtainer 7 obtains "0" as the character insertion position. After the word "maido" in kanji, if a character string "arigatou" in kana, which represents the reading of the word "arigatou" in kanji and kana, is input in entirety; the obtainer 7 obtains "2" as the character insertion position with "arigatou" in kana serving as the reading information.

The searcher 8 specifies, as a character string to be searched for, a character string that, from among a plurality of character strings stored in the second memory 2, has the corresponding voice position information included in the reproduction section information detected by the detector 6. For example, if the reproduction start position of the voice data is "0 s" and the reproduction end position of the voice data is "1.5 s (1500 ms)", then the detector 6 detects, as the reproduction section information, the time information indicating the section from the reproduction start position "0 s" to the reproduction end position "1.5 s (1500 ms)". In this case, from among a plurality of character strings stored in the second memory 2, the searcher 8 specifies a character string having the corresponding voice position information included in the section from "0 s" to "1.5 s (1500 ms)" as a character string to be searched for. Then, the searcher 8 searches the specified character string for a character string including the reading indicated by the reading information that is obtained by the obtainer 7; and obtains input candidate information including the concerned character string, the voice recognition score, and the end node index information.

The display controller 9 presents, to the user via a display unit, the character string that is instructed as the input candidate by the determiner 13 or the character string that is obtained as the input candidate by the follow-on searcher 11. While displaying the input candidate upon obtaining the reading (i.e., during an operation performed at Step S9 in a flowchart illustrated in FIG. 5 (described later)), the display controller 9 obtains the display position from the character insertion position obtained by the obtainer 7 (i.e., an operation at Step S2 in the flowchart illustrated in FIG. 5 (described later)). Moreover, at the time of displaying follow-on candidates obtained according to candidate selection performed the user (i.e., by performing an operation at Step S16 in the flowchart illustrated in FIG. 5 (described later)), the display controller 9 obtains the display position from the character insertion position obtained by the obtainer 7 and the number of characters in the character string selected as the input candidate by the user.

The selector 10 receives the selection input of the input candidate from the user; confirms the input candidate to be selected as per the user instruction as the input text; and inserts the input candidate in the transcription text. Then, the user can perform a selection input for instructing the selection of one of the displayed input candidates. Herein, the method of performing selection input is arbitrary. For example, the configuration can be such that the user touches the display position of the desired input candidate on the display screen (i.e., performs a touch operation with respect to the display screen) and performs the selection input. Alternatively, the selection input can be made possible by the operation of an operation device such as a keyboard, a mouse, or a pointing device. Meanwhile, in the first embodiment, in order to streamline the input operation of the user, character strings written in kanji-mixed characters are presented as the input candidates.

When the user selects an input candidate, the follow-on searcher 11 obtains the end note index of the selected input candidate and searches the voice recognition result for the candidate character string having the end node index at the start node. When there is one or more presented input candidates, the follow-on searcher 11 instructs the display controller 9 to display the input candidates.

Meanwhile, the configuration can be such that, the voice position of the end node is attached as attached information of an input candidate. Thus, when the user selects a candidate, the reproduction controller 5 updates the voice reproduction position to the voice position of the end node.

The threshold value updater 12 associates the input candidate information, which is obtained by the searcher 8, and the character insertion position, which is obtained by the obtainer 7; and records the associated information as candidate history data in the third memory 14. Moreover, the threshold value updater 12 decides on a display threshold value, which is used by the determiner 13 for comparison with voice recognition scores, using at least one of the voice recognition scores of the candidate history data stored in the third memory 14 and the voice recognition scores of the candidate character strings selected by the selector 10 by user selection of the candidate character strings. In other words, according to the degree of coincidence between the candidate character strings of the candidate history data and some of the transcription text or according to the user selection with respect to the input candidate; the threshold value updater 12 updates the display threshold value stored in the third memory 14.

With respect to the input candidate information obtained by the searcher 8, the determiner 13 compares the voice recognition scores of the input candidates as well as compares the display threshold value; and instructs the display controller 9 to display the character strings of the input candidates that correspond to the voice recognition scores equal to or greater than the display threshold value.

When changes are made in the transcription text, the history updater 15 updates the candidate history data, which is stored in the third memory 14, according to the changes.

Figure 5:
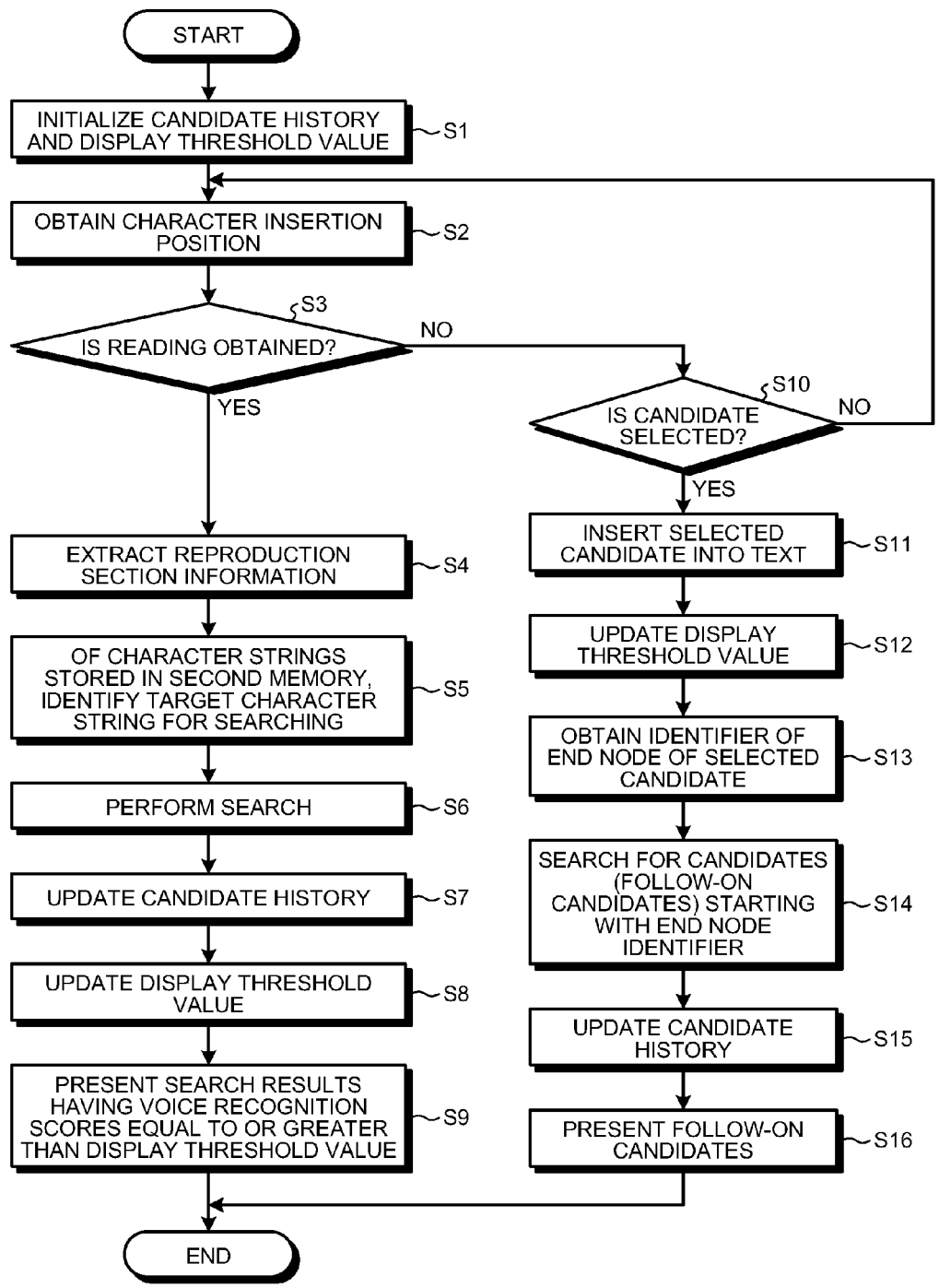
FIG. 5 is a flowchart for explaining the operations performed in an information processing device according to the first embodiment.

Given below is the explanation of the operations performed in the information processing device according to the first embodiment. FIG. 5 is a flowchart for explaining the operations performed in the information processing device. With reference to the flowchart illustrated in FIG. 5, firstly, the threshold value updater 12 initializes the candidate history data stored in the third memory 14 and initializes the display threshold value (Step S1). Then, the obtainer 7 obtains the character insertion position that represents the insertion position of a character string in the transcription text (Step S2). Subsequently, from the voice data reproduced by the reproducer 3, the obtainer 7 obtains the reading information of a character string that represents the reading of the text written by the user. Then, the detector 6 determines whether or not the reading information has been obtained (Step S3). If it is determined that the reading information has been obtained (Yes at Step S3), then the detector 6 detects the reproduction section information that indicates the section reproduced by the reproducer 3 (Step S4).

Subsequently, the detector 6 specifies, as a character string to be searched for, a character string that is included in the reproduction section information detected by the detector 6 from among a plurality of character strings stored in the second memory 2 (Step S5). Moreover, the detector 6 searches the specified character string for a character string including the reading character string obtained by the obtainer 7; and obtains input candidate information containing the concerned candidate string, the voice recognition score, and the end node index information (Step S6).

Then, the history updater 15 associates the candidate character string and the voice recognition score of the input candidate information, which is obtained by the searcher 8, with the character insertion position obtained by the obtainer 7; and stores the associated information as candidate history data in the third memory 14 (Step S7). Moreover, the threshold value updater 12 updates the display threshold value using the candidate history data and the transcription text (Step S8).

Then, with respect to the input candidate obtained by the searcher 8, the determiner 13 determines whether or not the voice recognition score is equal to or greater than a display threshold value. If a voice recognition score is equal to or greater than the display threshold value, the determiner 13 instructs the display controller 9 to display the corresponding candidate character string. Thus, the display controller 9 displays the candidate character string on a display unit so as to present it to the user (Step S9).

Meanwhile, if it is determined that the reading information has not been obtained by the obtainer 7 (No at Step S3), then the detector 6 determines whether or not the user has selected the input candidate (Step S10). If it is determined that the user has not selected the input candidate (No at Step S10), then the system control returns to Step S2. On the other hand, if it is determined that the user has selected the input candidate (Yes at Step S10), then the system control proceeds to Step S11.

Then, the selector 10 selects the character string of the input candidate selected by the user, and inserts that character string in the transcription text (Step S11). Subsequently, the threshold value updater 12 updates the display threshold value using the voice recognition score of the input candidate selected by the user (Step S12).

Then, the follow-on searcher 11 obtains the end node index of the input candidate selected by the user (Step S13). Subsequently, the follow-on searcher 11 obtains input candidate information starting with the end node index (Step S14).

Then, according to the candidate character string inserted by the selector 10, the history updater 15 updates the candidate history data stored in the third memory 14; and further adds the input candidate information, which is obtained by the follow-on searcher 11, to the candidate history data stored in the third memory 14 (Step S15). Subsequently, the follow-on searcher 11 uses the display controller 9 and displays the candidate string of the input candidate on a display unit so as to present it to the user (Step S16).

Figure 6:
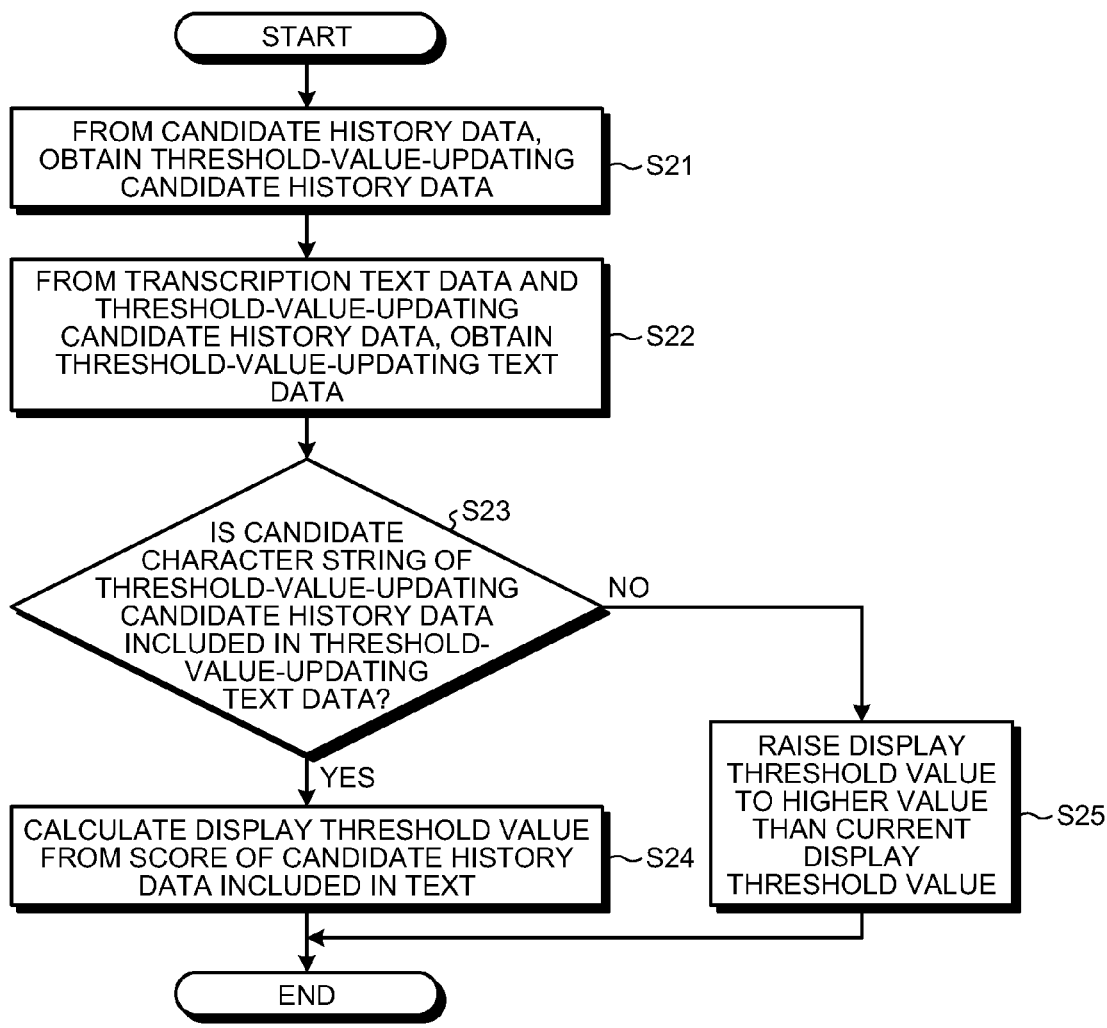
FIG. 6 is a flowchart for explaining the details of an operation in which a threshold value updater updates a display threshold value when reading information is obtained.

Explained below with reference to the flowchart illustrated in FIG. 6 is the detailed explanation of the operation performed at Step S8, that is, the operation of updating the display threshold value in the case in which the obtainer 7 obtains the reading information. Herein, the operation of updating the display threshold value can either be performed every time a reading is obtained or be performed once after obtaining the reading for several times.

In this case, firstly, the threshold value updater 12 obtains, from the candidate history data stored in the third memory 14, the candidate history data to be subjected to threshold value updating (herein, called threshold-value-updating candidate history data) (Step S21). For example, from among the pieces of candidate history data, the previously-added piece of candidate history data is considered to be the threshold-value-updating candidate history data. Alternatively, the candidate history data for which the character insertion position is within a certain range from the current character insertion position (obtained at Step S2 described above) can be considered to be the threshold-value-updating candidate history data.

Then, from the transcription text stored in the third memory 14 and from the threshold-value-updating candidate history data, the threshold value updater 12 obtains the text to be subjected to threshold value updating (hereinafter, called a threshold-value-updating text) (Step S22). For example, in the transcription text, a character string having a certain number of characters before and after the character insertion position of the threshold-value-updating candidate history data is considered to the threshold-value-updating text.

Then, the threshold value updater 12 searches the threshold-value-updating candidate history data for the candidate history data having the candidate strings included in the threshold-value-updating text (Step S23). If there exists the candidate history data having the candidate strings included in the threshold-value-updating text (Yes at Step S23), then the threshold value updater 12 calculates the display threshold value from the voice recognition score of the concerned candidate history data (Step S24). For example, if the candidate history data has the voice recognition score of "75", then the threshold value updater 12 sets the display threshold value to a lower value of "70". If searching for the threshold-value-updating candidate of history data included in the threshold-value-updating text yields a plurality of search results, then the threshold value updater 12 can calculate the display threshold value from a statistical value such as the average value of the respective voice recognition scores.

On the other hand, if there does not exist any candidate history data having the candidate strings included in the threshold-value-updating text (No at Step S23), then the threshold value updater 12 raises the display threshold value by a certain value from the current display threshold value (Step S25). For example, if the current display threshold value is set to "70", then the threshold value updater 12 sets the display threshold value to "75".

Figure 7:
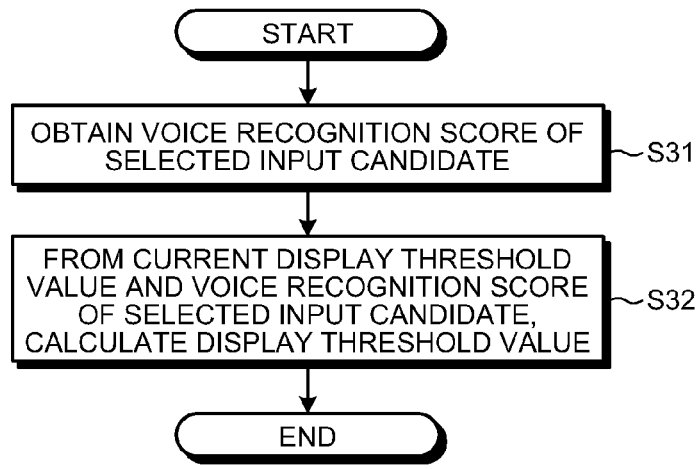
FIG. 7 is a flowchart for explaining an operation in which the threshold value updater updates the display threshold value when the user has selected a candidate.

Given below with reference to the flowchart illustrated in FIG. 7 is a more detailed explanation of the operation performed at Step S12 for updating the display threshold value in the case in which the user has selected the candidate. With reference to the flowchart illustrated in FIG. 7, firstly, the threshold value updater 12 obtains, from the second memory 2, the voice recognition score of the input candidate selected by the user (Step S31).

Then, the threshold value updater 12 calculates and updates the display threshold value from the current display threshold value and the voice recognition score of the input candidate selected by the user (Step S32). For example, if the current display threshold value is set to "70" and if the voice recognition score of the selected input candidate is set to "75", then the threshold value updater 12 updates the display threshold value to "65".

Given below is the explanation of user operations and the operations performed by each constituent element in an example related to the transcription task of voice data "maido arigatou gozaimasu. CBA kaisha de gozaimasu." in kanji and kana. Herein, it is assumed that the display threshold value has an initial value of "50", and the candidate history data has empty (void) initial data.

Figure 8:
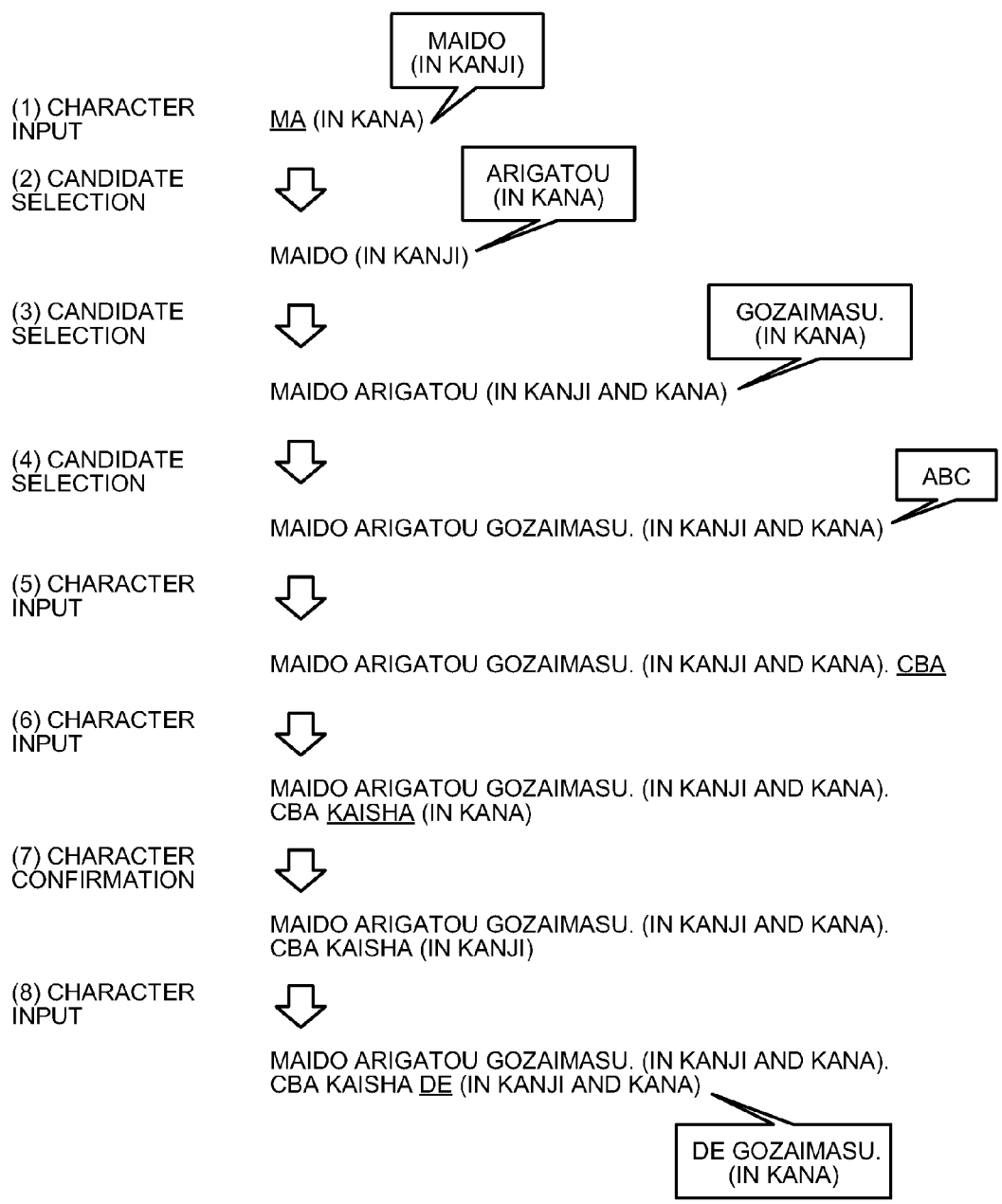
FIG. 8 is a diagram illustrating an example of user operations and candidate display.

Explained below with reference to FIG. 8 is a flow of operations during a character input operation performed by the user using the information processing device according to the first embodiment. Firstly, in FIG. 8, a reference numeral (1) represents a state in which the user operates a keyboard and, while listening to the voice data, inputs a kana character "ma" at the start of the transcription text. In this case, the obtainer 7 obtains the kana character "ma" input by the user and obtains the character insertion position "0" of the transcription text.

The searcher 8 searches the character strings stored in the second memory 2, for the candidate characters starting with "ma". As a result of performing the search, for example, if the character string "maido" in kanji having ID=2 illustrated in FIG. 2 is found; then the history updater 15 stores the candidate history data having the character insertion position "0", having the character string "maido" in kanji as the candidate character string, and having the voice recognition score "100" in the third memory 14 as illustrated for ID=1 in FIG. 4.

Once the candidate history data is stored in the third memory 14, the determiner 13 compares the current display threshold value "50 (the initial value of the display threshold value)" with the voice recognition score "100" of the character string "maido" in kanji stored in the third memory 14. In this example, since the voice recognition score "100" of the character string "maido" in kanji is greater than the current display threshold value "50", the determiner 13 instructs the display controller 9 to display the character string "maido" in kanji that is an input candidate. In response, the display controller 9 displays the input candidate "maido" in kanji to the user via the display unit. In this example, as illustrated with reference to the reference numeral (1) in FIG. 8, the display controller 9 displays the candidate character string "maido" in kanji of the input candidate information in the upper part of the current character insertion position "0".

Meanwhile, when a plurality of input candidates is present, the display controller 9 displays the candidate character string that corresponds to the input candidate information having the greatest voice recognition score. Regarding the character insertion position in the example of the character string "maido" in kanji, the character insertion position "0" implies that the first part (=the beginning) of the character "mai" in kanji represents the character insertion position. Moreover, the character insertion position "1" implies that the latter part of the character "mai" in kanji (between the character "mai" in kanji and the character "do" in kanji) represents the character insertion position. Similarly, the character insertion position "2" implies that the latter part of the character "do" in kanji represents the character insertion position.

In FIG. 8, reference numerals (2) to (4) represent a candidate selection operation performed by the user. When the candidate character string "maido" in kanji, which is displayed as an input candidate, is appropriate; the user presses a shortcut key, for example, and selects the candidate character string "maido" in kanji. Upon detecting the selection made by the user, the selector 10 inserts the selected candidate character string "maido" in kanji in the character insertion position "0" of the transcription text.

The follow-on searcher 11 refers to the character strings stored in the second memory 2; searches for the identifier of the end node of the input candidate selected by the user; and searches for such input candidates which have the retrieved end node index as the start node index. For example, in this example, with reference to ID=2 illustrated in FIG. 2, the follow-on searcher 11 searches for the end node of the candidate character string "maido" in kanji and obtains the end node "3". Then, as the candidate character strings having the end node index "3" as the start node index, the follow-on searcher 11 obtains a candidate character string "ari (ant)" in kanji (having ID=5 in FIG. 2) and a candidate character string "arigatou" in kana (having ID=7 in FIG. 2).

Once the input candidates related to the input candidate selected by the user are retrieved, the history updater 15 stores a variety of information such as IDs of the retrieved input candidates, the candidate character strings of the retrieved input candidates, the voice recognition scores of the retrieved input candidates, and the character insertion positions of the retrieved input candidates as the candidate history data in the third memory 14. In this example, the candidate character string "ari" in kanji and the candidate character string "arigatou" in kana are retrieved as the candidate character strings that would follow "maido" in kanji. Hence, in the third memory 14, the candidate character string "ari" in kanji is stored along with the corresponding ID "5", the corresponding voice recognition score "25", and the corresponding character insertion position "2" (see ID=3 illustrated in FIG. 3). In an identical manner, in the third memory 14, the candidate character string "arigatou" in kana is stored along with the corresponding ID "7", the corresponding voice recognition score "100", and the corresponding character insertion position "2" (see ID=2 illustrated in FIG. 3). In this example, the character insertion position "2" implies that the latter part of the character "do" in kanji of "maido" in kanji represents the character insertion position.

The follow-on searcher 11 instructs the display controller 9 to display the candidate character strings. Then, the display controller 9 presents the candidate character strings to the user via the display unit. In this example, since the candidate character string "arigatou" in kana and the candidate character string "ari" in kanji are retrieved; the follow-on searcher 11 displays the candidate character string "arigatou" in kana, which has the greatest voice recognition score (see ID=7 in FIG. 2), in the upper posterior part of the character string "maido" in kanji, which is inserted by the selector 10, as illustrated with reference to the reference numeral (2) in FIG. 8.

If the candidate character string "arigatou" in kana that is displayed as an input candidate is appropriate; when the user selects the character string "arigatou" in kana that is an input candidate, the character string "arigatou" in kana is inserted subsequent to the character string "maido" in kanji and is presented to the user as illustrated with reference to the reference numeral (3) in FIG. 8. Moreover, in an identical manner, the follow-on searcher 11 searches for the candidate character strings that would follow the character string "arigatou" in kana selected by the user. For example, if a character string "gozaimasu." in kana is retrieved as the candidate character string that would follow the character string "arigatou" in kana, then the follow-on searcher 11 instructs the display controller 9 to display the candidate character string "gozaimasu." in kana. In response, with reference to the reference numeral (3) in FIG. 8, the display controller 9 displays the candidate character string "gozaimasu." in kana on the display unit. Then, the history updater 15 stores, in the third memory 14, the candidate history data (see ID=4 in FIG. 4) having the character insertion position "7 (the insertion position subsequent to the character "u" of "arigatou" in kana), having the candidate character string "gozaimasu." as the candidate character string, and having the voice recognition score "100".

If the candidate character string "gozaimasu." in kana that is displayed as an input candidate is appropriate; when the user selects the character string "gozaimasu." in kana that is an input candidate, a search is performed for follow-on candidates that would follow the character string "gozaimasu." in kana. As a result of performing such a search, if it is assumed that, for example, a character string "ABC" is retrieved, it is displayed in the upper posterior part of the character string "gozaimasu." in kana as illustrated with reference to the reference numeral (4) in FIG. 8. Then, the history updater 15 stores, in the third memory 14, the candidate history data (see ID=5 in FIG. 4) having the character string "ABC" as the candidate character string, having the character insertion position "12 (the insertion position subsequent to the character "su" of "gozaimasu." in kana), having the voice recognition score "75", and having ID "13".

In FIG. 8, reference numerals (5) to (7) represent an operation of inputting a desired character string performed by the user. If the candidate character string "ABC" that is displayed as an input candidate to follow the character string "gozaimasu." in kana is not appropriate; the user operates an input device such as a keyboard and, as illustrated with reference to the reference numeral (5) in FIG. 8, inputs the desired character string such as "CBA", in place of the displayed follow-on candidate. Then, the obtainer 7 obtains the characters "CBA" input by the user. Subsequently, the searcher 8 searches the character strings stored in the second memory 2, for the candidate character strings starting from "C". In case no candidate character string starting from "C" is found, the searcher does not issue a display instruction to the display controller 9. For that reason, on the display unit, no input candidate is displayed that would follow "CBA". In this case, the threshold value updater 12 compares the candidate character string "ABC" displayed as the follow-on candidate and the character string "CBA" input by the user. Since the two character strings do no coincide, the threshold value updater 12 updates the current display threshold value from "50" to "80".

Then, the user operates the keyboard and inputs a kana character "ka". The obtainer 7 obtains the kana character "ka" and the searcher 8 searches the character strings stored in the second memory 2, for candidate character strings starting with the kana character "ka". For example, if a candidate character string "kaisha" in kanji is retrieved, then the history updater 15 stores, in the third memory 14, the candidate history data having the candidate character string "kaisha", having ID "14", having the voice recognition score "75", and having the character insertion position "15" as illustrated for ID=6 in FIG. 4.

Then, the determiner 13 compares the voice recognition score "75" of the input candidate (the candidate character string "kaisha" in kanji) with the current display threshold value. In this example, the current display threshold value has been updated to "80". Hence, the determiner 13 determines that the voice recognition score "75" of the input candidate information (the candidate character string "kaisha" in kanji) is smaller than the current threshold value "80", and does not issue a display instruction to the display controller 9. Consequently, no candidate character string is displayed on the display unit. Hence, as illustrated with reference to the reference numeral (6) in FIG. 8, after inputting the kana character "ka", the user inputs kana characters "i" and "sha"; performs kana-kanji conversion; displays the kanji of "kaisha" on the display unit as illustrated with reference to the reference numeral (7) in FIG. 8; and confirms the input.

Once the user has input the desired character string, the threshold value updater 12 searches the pieces of candidate history data, which are stored in the third memory 14, for the candidate history data having the same candidate character string as the character string (the transcription text) input by the user. In this example, the user inputs the character string "kaisha" in kanji, and the candidate history data "kaisha" in kanji has been stored in the third memory 14 as illustrated in FIG. 4. Hence, the threshold value updater 12 determines that a candidate string identical to the candidate string input by the user is stored as the candidate history data in the third memory 14, and updates the display threshold value from "80" to "70".

Then, as illustrated with reference to the reference numeral (8) in FIG. 8, the user operates the keyboard and inputs a kana character "de". The obtainer 7 obtains the kana character "de". The searcher 8 searches the character strings stored in the second memory 2, for candidate character strings starting with the kana character "de"; and, for example, obtains the input candidate information of "de gozaimasu." in kana. Then, the history updater 15 stores, in the third memory 14, the candidate history data having the character insertion position "17", having the character string "de gozaimasu." in kana as the candidate character string, having the voice recognition score "75", and having ID "15" as illustrated for ID=7 in FIG. 4.

Then, the determiner 13 compares the voice recognition score of the candidate character string "de gozaimasu." in kana with the current display threshold value. As described above, the current display threshold value has been updated from "80" to "70". The candidate character string "de gozaimasu." in kana has the voice recognition score of "75". Since the voice recognition score "75" of the candidate character string "de gozaimasu." in kana is greater than the current display threshold value "70", the determiner 13 issues a display instruction to the display controller 9. As a result, for example, the candidate character string "de gozaimasu." in kana is displayed in the upper posterior part of the character string "kaisha" in kanji (i.e., in the upper part of the character insertion position "17" that is posterior to the character string "kaisha" in kanji) as illustrated with reference to the reference numeral (8) in FIG. 8.

If the character string "de gozaimasu." in kana that is displayed as an input candidate is appropriate, the user selects that character string. As a result, the follow-on candidates that would follow the user-selected input candidate "de gozaimasu." in kana are retrieved and displayed. However, if the character string "de gozaimasu." in kana that is displayed as an input candidate is not appropriate, the user inputs a desired character string. When the user inputs the desired character string, it is determined whether or not a character string identical to the character string input by the user is stored as the candidate history data in the third memory 14. If a character string identical to the character string input by the user is not stored in the third memory 14, then the display threshold value is updated to a value greater than the current value. On the other hand, if a character string identical to the character string input by the user is stored in the third memory 14, then the display threshold value is updated to a value smaller than the current value. These are the operations as described above.

As is clear from the explanation given above, in the information processing device according to the first embodiment, the information indicating the voice recognition scores and the end node indexes obtained as the result of a voice recognition is stored as the information about input candidates. Then, the input candidates having the voice recognition scores equal to or greater than the display threshold value are presented to the user. As a result, it becomes possible to streamline the transcription task while avoiding presentation of unnecessary input candidates.

Moreover, the presented input candidates and the character insertion positions are associated with each other and stored as the candidate history data. Then, according to the voice recognition scores of the candidate history data and the user selection of an input candidate, the display threshold value is updated. If the user selects a presented input candidate, then the selected input candidate is inserted in the transcription text; the information is obtained about the end node index of the selected input candidate; the input candidate starting with the end node index is retrieved; and the retrieved input candidate is presented to the user. As a result, simultaneous to the selection of the input candidate, the input candidates that would follow the selected candidate can be presented to the user. That enables achieving further streamlining of the transcription task.

Second Embodiment

Given below is the explanation of an information processing device according to a second embodiment. As compared to the first embodiment described above, the second embodiment differs in that a plurality of input candidates is presented in response to an instruction from the user. The following explanation is given for only that difference, and the redundant explanation is omitted.

Figure 9:
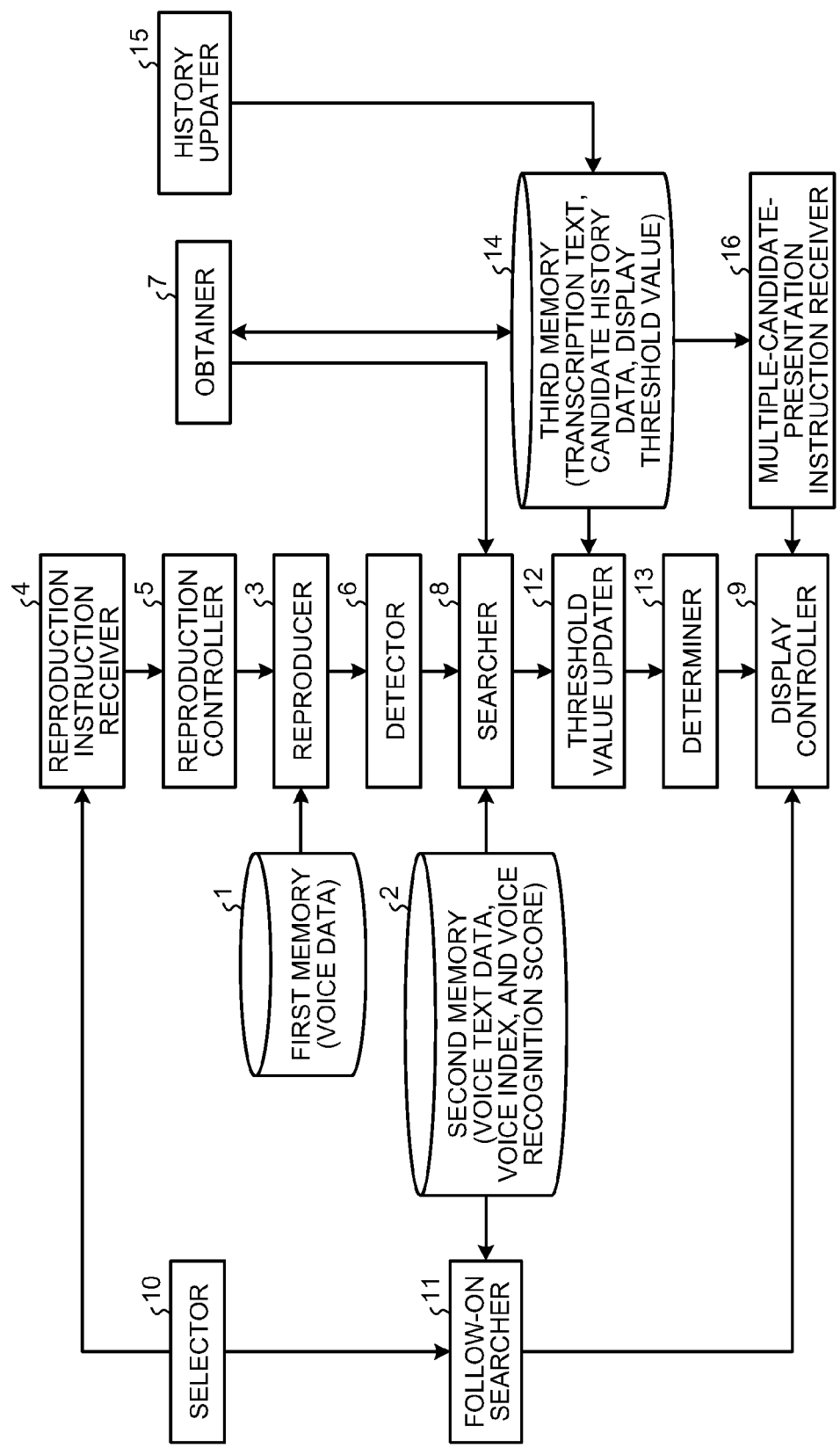
FIG. 9 is a functional block diagram of an information processing device according to a second embodiment.

FIG. 9 is a functional block diagram of the information processing device according to the second embodiment. As compared to the information processing device illustrated in FIG. 1 according to the first embodiment, the information processing device illustrated in FIG. 9 according to the second embodiment differs in the way of further including a multiple-candidate-presentation instruction receiver 16.

Figure 10:
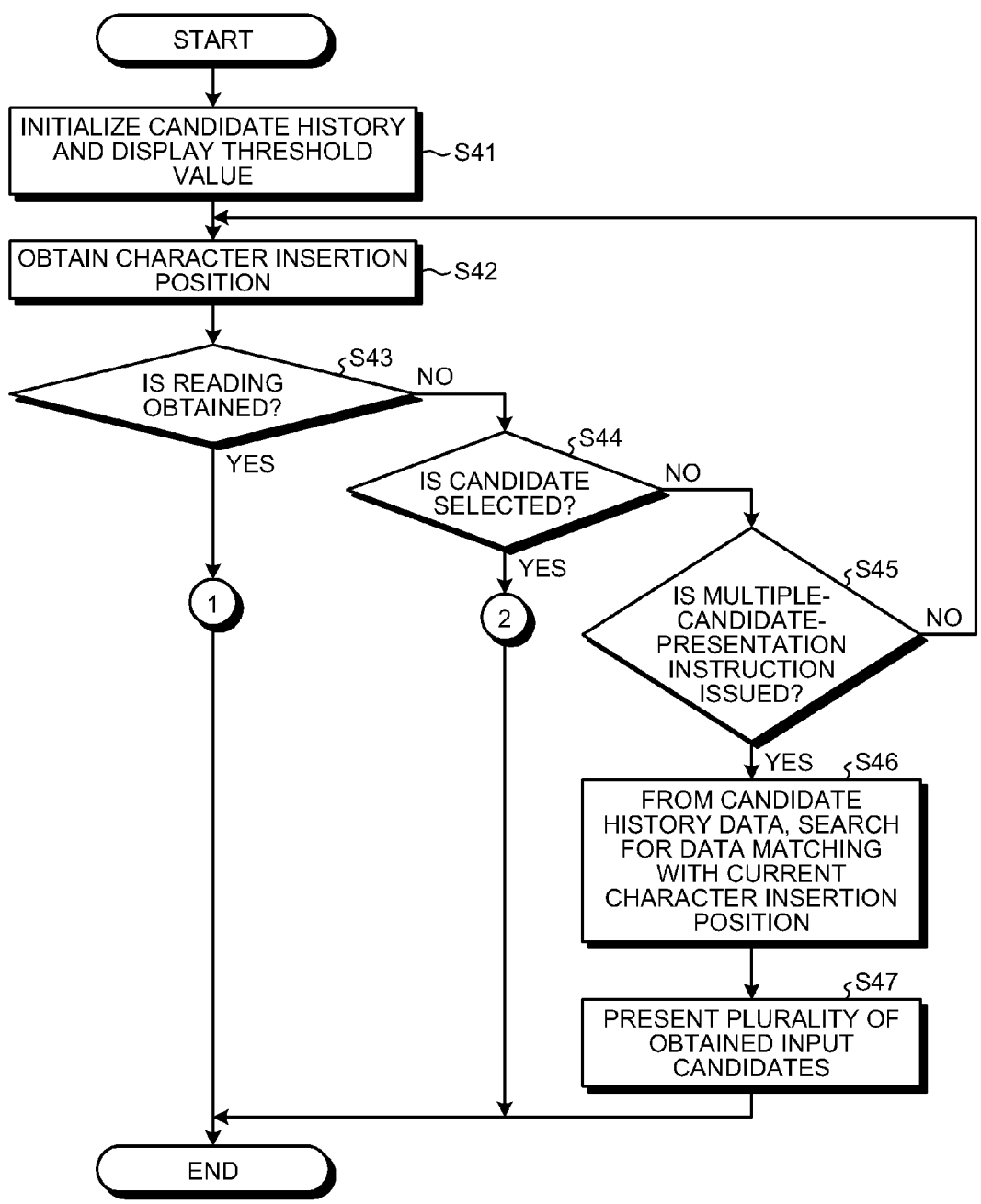
FIG. 10 is a flowchart for explaining the operations performed in the information processing device according to the second embodiment.

Explained below with reference to a flowchart illustrated in FIG. 10 are the distinguishing operations of the information processing device according to the second embodiment. In the flowchart illustrated in FIG. 10, the operations from Step S41 to Step S43 correspond to the operations from Step S1 to Step S3 in the flowchart illustrated in FIG. 5. Moreover, in the flowchart illustrated in FIG. 10, the operation at Step S44 corresponds to the operation at Step S10 in the flowchart illustrated in FIG. 5. Hence, regarding the operations from Step S41 to Step S44, the explanation of the corresponding steps is given with reference to the flowchart illustrated in FIG. 5.

At Step S44 in the flowchart illustrated in FIG. 10, if it is determined that the user has not selected the candidate character string that is displayed (No at Step S44), then the multiple-candidate-presentation instruction receiver 16 determines whether or not the user has performed a predetermined key operation corresponding to a multiple-candidate-presentation instruction and thus determined whether or not an instruction to present a plurality of input candidates has been issued. If the user has not issued an instruction to present a plurality of input candidates (No at Step S45), then the system control returns to Step S42.

On the other hand, if the user has issued an instruction to present a plurality of input candidates (Yes at Step S45), then the system control proceeds to Step S46 and the searcher 8 searches the candidate history data, which is stored in the third memory 14, for the candidate character strings that coincide with the current character insertion position (Step S46). For example, with reference to the example illustrated in FIG. 4, when the current character insertion position is "2", the candidate character string "arigatou" in kana and the candidate character string "ari" in kanji have the respective character insertion positions set to "2". Thus, the candidate character string "arigatou" in kana and the candidate character string "ari" in kanji have the respective character insertion positions coinciding with the current character insertion position. For that reason, the searcher 8 retrieves those two candidate character strings.

If the candidate history data does not contain a candidate character string that coincides with the current character insertion position, then the searcher 8 searches the character strings, which is stored in the second memory 2, for candidate character strings that coincide with the character present before a certain number of characters than the current character insertion position. Meanwhile, the configuration can be such that speech section information is held aside from the voice index, and the candidates are divided according to the speech sections.

Then, the searcher 8 instructs the display controller 9 to display the retrieved candidate character strings (Step S47). As a result, the two candidate character strings, namely, the candidate character string "arigatou" in kana and the candidate character string "ari" in kanji that are retrieved by the searcher 8 are displayed on the display unit and presented to the user. More particularly, when a plurality of candidate character strings is present, the display controller 9 calculates the display positions of the candidate character strings from the current character insertion position, the number of candidate character strings, and the length of each candidate character string; and displays the candidate character strings at the calculated display positions. At that time, the display controller 9 displays the candidate character strings in descending order of the voice recognition scores.

In FIG. 11 is illustrated a display example of a plurality of candidate character strings. Assume that the user has input a character "no" in kana and, for example, a candidate character string "no tarou desu." in kana and kanji is displayed. Then, assume that the user operates a shortcut key and issues a multiple-candidate-presentation instruction. Then, the multiple-candidate-presentation instruction receiver 16 receives the multiple-candidate-presentation instruction. The searcher 8 searches the candidate history data for the pieces of candidate history data that coincide with the current insertion position. Then, assume that the searcher 8 obtains three candidate character strings, namely, "no tarou desu." in kana and kanji, "no jirou desu." in kana and kanji, and "no saburou desu." in kana and kanji. The display controller 9 concurrently displays the three candidate character strings as, for example, illustrated in FIG. 11 and presents them to the user at once.

In this way, in the information processing device according to the second embodiment, it becomes easier for the user to select the desired candidate character string from among a plurality of candidate character strings. Hence, not only does it become possible to further streamline the transcription task but it also becomes possible to achieve the same effect as the first embodiment.

Third Embodiment

Given below is the explanation of an information processing device according to a third embodiment. As compared to the embodiments described above, the third embodiment differs in that the lattice structure of the voice recognition result stored in the second memory 2 is converted into a trie structure and then stored. In the third embodiment, that is the only difference from the embodiments described above. Hence, the following explanation is given for only the difference, and the redundant explanation is omitted.

Figure 12:
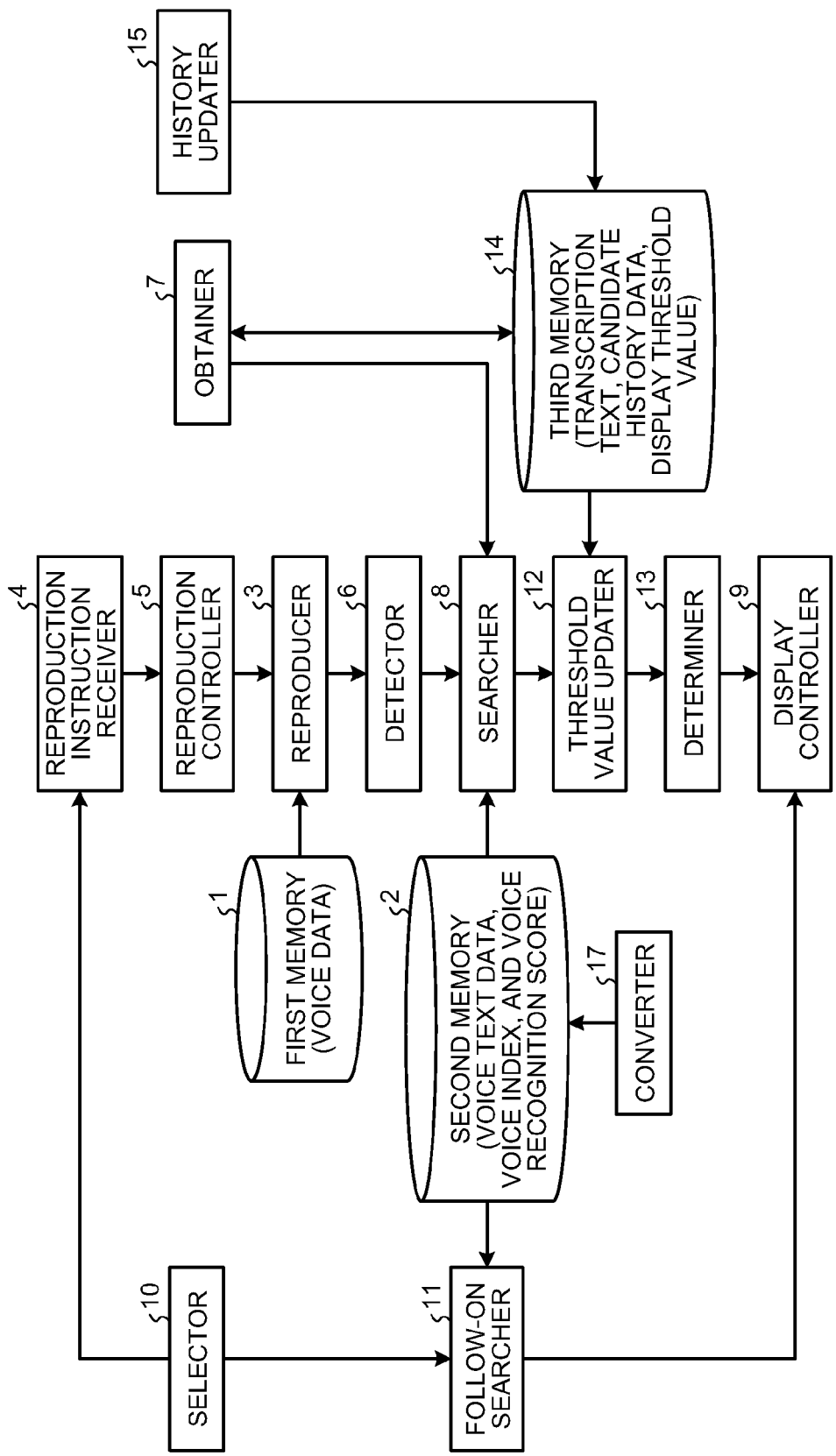
FIG. 12 is a functional block diagram of an information processing device according to a third embodiment.

FIG. 12 is a functional block diagram of the information processing device according to the third embodiment. The information processing device according to the third embodiment further includes a converter 17 that converts the lattice structure of the voice recognition result into a trie structure and stores it in the second memory 2.

Figure 13:
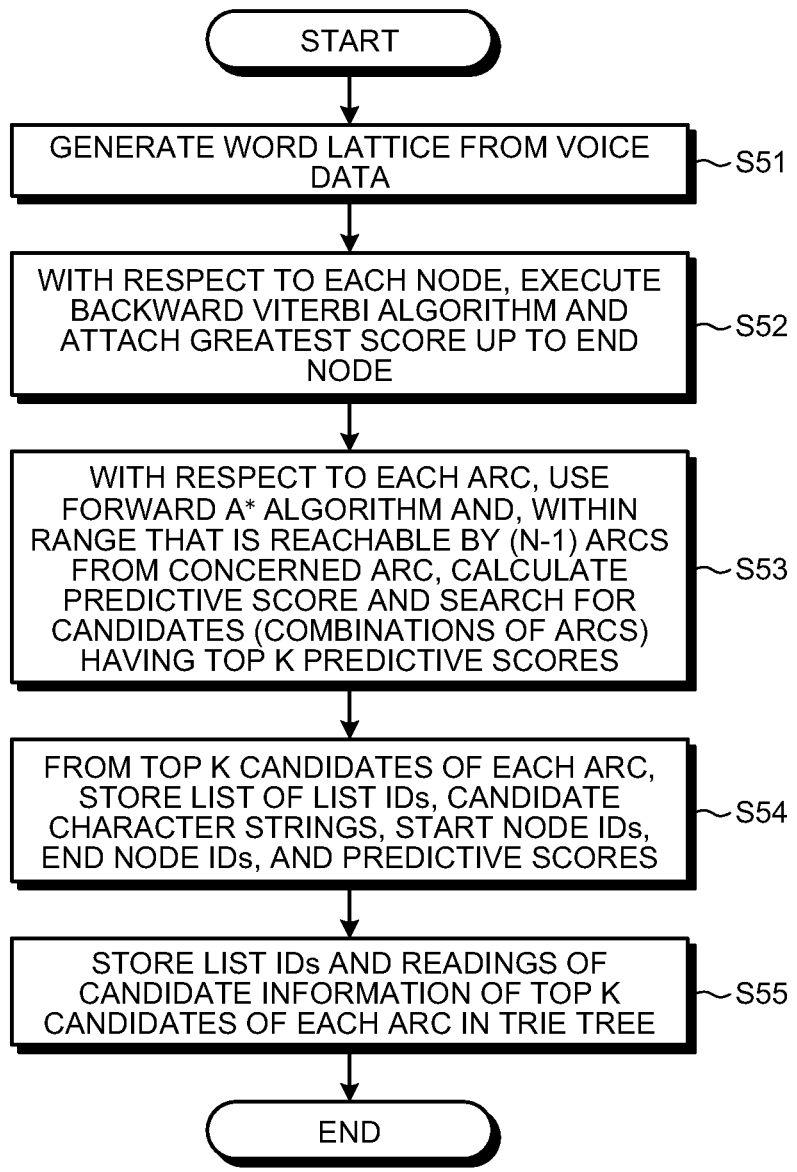
FIG. 13 is a flowchart for explaining the operations performed for converting a lattice structure into a trie structure.

FIG. 13 is a flowchart for explaining the operations performed by the converter 17 that converts the voice recognition result having a lattice structure into a voice recognition result having a trie structure. With reference to the flowchart illustrated in FIG. 13, firstly, from the voice data, the converter 17 generates a word lattice having voice recognition scores as, for example, illustrated in FIG. 3 (Step S51). Then, the converter 17 executes a backward Viterbi algorithm with respect to the obtained lattice; and, at each node, calculates the greatest (or the smallest) score (node_best_score) up to the end node of the entire lattice (up to the node E illustrated in FIG. 3) (Step S52).

Then, with respect to each arc, the converter 17 executes the forward A* algorithm and, from among the combinations of N−1 number of arcs adjacent to the right-hand side node of the concerned arc, searches for top K candidates (combinations of arcs) having a large (or a small) predictive score (predictive_score) (described later) (Step S53). The reason for setting the number of adjacent arcs to N−1 is to have character strings with N number of words (commonly called N-gram) including the character string of the concerned arc.

Herein, the predictive score (predictive_score) is calculated using the equation given below.

$$\text{Predictive\_score}(j) = \text{node\_score}(i) + \text{arc\_score}(i,j) + \text{node\_best\_score}(j)$$

where, "i" and "j" represent node IDs. Moreover, "arc_score(i, j)" represents the score of the arc connecting the node i and the node j (i.e., the voice recognition score of the word lattice). Furthermore, "node_score(i)" represents the greatest (or the smallest) score up to the node i. If the arc having the node i at the end has "i−1" as the start node, then "node_score(i)" represents the greatest (or the smallest) score calculated using "node_score(i−1)+arc_score(i−1, i)". For the start node S of the lattice, the score node_score(s) is assumed to be "0". Moreover, "node_best_score(i)" represents the final score (calculated at Step S52) from the node i to the end node.

Meanwhile, at Step S53, if a particular character string (for example, a period ".") is present on an arc, then the search with respect to that arc may be terminated.

Subsequently, from the top K candidates in each arc (from a combination of arcs), the converter 17 stores, in the second memory 2, a list such as a list illustrated in FIG. 14 that contains candidate character strings obtained by connecting the character strings on the arcs, the start node IDs in the lattice, the end node IDs in the lattice, the predictive scores, and list IDs that enable unique identification of the above-mentioned information (Step S54). With reference to FIG. 14, the list is made with the setting of N=3 and K=3.

Figure 15:
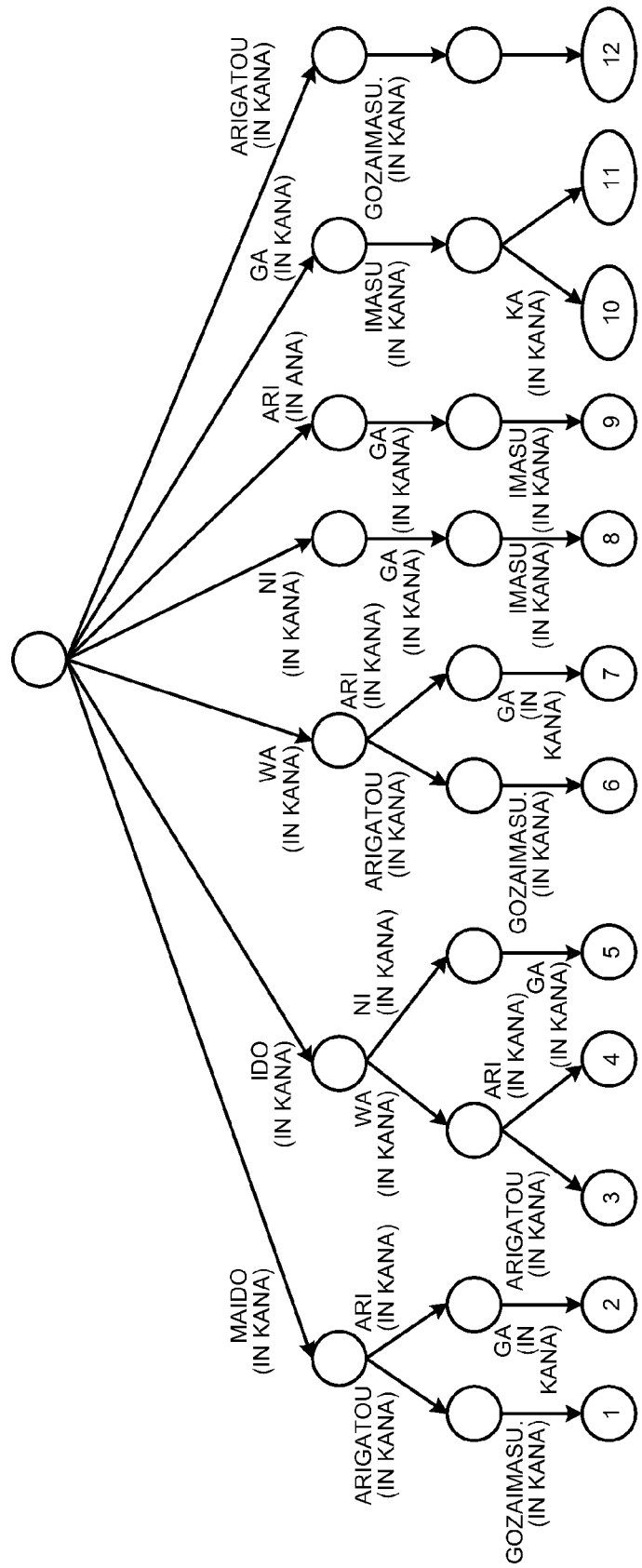
FIG. 15 is a diagram illustrating an example of a trie structure of voice recognition results.

Then, for example, as illustrated in FIG. 15, from the top K candidates in each arc, the converter 17 stores the reading information obtained by connecting reading character strings in the arcs and the list IDs in a trie tree; and converts the voice recognition result from having a lattice structure to having a trie structure (Step S55). Herein, the trie structure of the candidate character strings illustrated in FIG. 15 has the setting of N=3 and K=3 in an identical manner to FIG. 14.

Meanwhile, at Steps S54 and S55, instead of storing the top K candidate character strings of all arcs as the list and the trie structure, it is possible to store the candidate character strings having the predictive score equal to or greater than a certain value. Moreover, at Step S55, the candidate character strings can be stored in the trie structure.

In a trie structure, it becomes possible to carry on the search in the units of characters, thereby making it easier to narrow down the scope of the search. Hence, not only does it become possible to further enhance the search efficiency but it also becomes possible to achieve the same effect as the embodiments described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   a memory controller to store in a memory:
      a plurality of character strings included in a voice text obtained by performing a voice recognition on voice data;
      a node index indicating start position information and end position information of each of the character strings in the voice text;
      a voice recognition score obtained by performing the voice recognition; and
      a voice index of voice position information indicating a position of each of the character strings in the voice data;
   a detector to detect reproduction section information which indicates a reproduced section of the voice data;
   an obtainer to obtain reading information, which represents at least a part of a character string representing reading of a phrase in a text written down from the voice data that has been reproduced, and obtain insertion position information, which indicates a character insertion position in the written text;
   a searcher to specify, as a target character string for searching, a character string that, from among the plurality of character strings stored in the memory, has the corresponding voice position information included in the reproduction section information, and search the specified character string for a character string that includes reading indicated by the reading information;
   a determiner to, when a value of the voice recognition score corresponding to the character string obtained by the searcher is equal to or greater than a display threshold value, determine to display the character string obtained by the searcher;
   a display controller to display the character string, which is determined by the determiner, on a display unit;
   a history updater to perform storage control to store, in a candidate history memory, candidate history data in which the character string obtained by the searcher, the voice recognition score, and the character insertion position are associated, and to update the candidate history data according to a change in a text;
   a selector to, when the character string displayed by the display controller is subjected to a selection operation, select the character string; and
   a threshold value updater to decide on the display threshold value, which is used in comparison with a voice recognition score by the determiner, using at least one of a voice recognition score of the candidate history data and a voice recognition score of the character string selected by the selector.

2. The device according to claim 1, further comprising a follow-on searcher to search for a character string which, as a node index of a start position thereof, has a node index of an end position of the character string selected by the selector, wherein
   the display controller displays, on the display unit, the character string which is retrieved by the follow-on searcher.

3. The device according to claim 1, further comprising a multiple-candidate-presentation instruction receiver to receive a multiple-candidate-presentation instruction, wherein
   the searcher searches for a character string corresponding to the character insertion position obtained by the obtainer, and
   the display controller calculates a position for displaying an input candidate from the character insertion position obtained by the obtainer, the number of character strings retrieved by the searcher, and a length of each character string, so as to display the character string retrieved by the searcher on the display unit.

4. The device according to claim 3, wherein
   when the searcher cannot retrieve a character string corresponding to the character insertion position, the searcher searches for a character which coincides with a character present before a certain number of characters than current character insertion position, and
   the display controller displays the retrieved coincident character as the input candidate on the display unit.

5. The device according to claim 1, further comprising a converter to convert a lattice structure obtained by the voice recognition result into a trie structure.

6. The device according to claim 5, wherein the converter includes
   a generator to generate, from the voice data, a word lattice having a voice recognition score;
   an extractor to, from each arc of the word lattice, extract M number of best arcs in descending order of the voice recognition scores, M being an integer; and
   a storage to store therein identification information, which is used in identifying the M number of best arcs that are extracted, in a trie tree.

7. An information processing method comprising:
   storing, by a memory controller, in a memory:
      a plurality of character strings included in a voice text obtained by performing a voice recognition on voice data;
      node index indicating start position information and end position information of each of the character strings in the voice text;
      a voice recognition score obtained by performing the voice recognition; and
      a voice index of voice position information indicating a position of each of the character strings in the voice data;
   detecting, by a detector, reproduction section information which indicates a reproduced section of the voice data;

obtaining, by an obtainer, reading information, which represents at least a part of a character string representing reading of a phrase in a text written down from the voice data that has been reproduced, and obtaining insertion position information, which indicates a character insertion position in the written text;

specifying, by a searcher, as a target character string for searching, a character string that, from among the plurality of character strings stored in the memory, has the corresponding voice position information included in the reproduction section information, and searching the specified character string for a character string that includes reading indicated by the reading information;

determining, by a determiner, when a value of the voice recognition score corresponding to the character string obtained at the searching is equal to or greater than a display threshold value, to display the character string obtained at the searching;

displaying, by a display controller, the character string, which is determined at the determining, on a display unit;

storing, by a history memory control unit, in a candidate history memory, candidate history data in which the character string obtained at the searching, the voice recognition score, and the character insertion position are associated;

updating, by a history updater, the candidate history data, which is stored in the candidate history memory, according to a change in a text;

selecting, by a selector, when the character string displayed at the displaying is subjected to a selection operation, the character string; and deciding on, by a threshold value updater, the display threshold value, which is used in comparison with a voice recognition score at the determining, using at least one of a voice recognition score of the candidate history data and a voice recognition score of the character string selected at the selecting.

8. A computer program product comprising a non-transitory computer readable medium containing an information processing program, wherein the information processing program, when executed by a computer, causes the computer to function as:

a memory controller to store, in a memory:

a plurality of character strings included in a voice text obtained by performing a voice recognition on voice data;

a node index indicating start position information and end position information of each of the character strings in the voice text;

a voice recognition score obtained by performing the voice recognition; and a voice index of voice position information indicating a position of each of the character strings in the voice data;

a detector to detect reproduction section information which indicates a reproduced section of the voice data;

an obtainer to obtain reading information, which represents at least a part of a character string representing reading of a phrase in a text written down from the voice data that has been reproduced, and obtain insertion position information, which indicates a character insertion position in the written text;

a searcher to specify, as a target character string for searching, a character string that, from among the plurality of character strings stored in the memory, has the corresponding voice position information included in the reproduction section information, and search the specified character string for a character string that includes reading indicated by the reading information;

a determiner to, when a value of the voice recognition score corresponding to the character string obtained by the searcher is equal to or greater than a display threshold value, determine to display the character string obtained by the searcher;

a display controller to display the character string, which is determined by the determiner, on a display unit;

a history updater to perform storage control to store, in a candidate history memory, candidate history data in which the character string obtained by the searcher, the voice recognition score, and the character insertion position are associated, and to update the candidate history data according to a change in a text;

a selector to, when the character string displayed by the display controller is subjected to a selection operation, select the character string; and a threshold value updater to decide on the display threshold value, which is used in comparison with a voice recognition score by the determiner, using at least one of a voice recognition score of the candidate history data and a voice recognition score of the character string selected by the selector.

* * * * *